(12) United States Patent
Register et al.

(10) Patent No.: US 11,376,801 B2
(45) Date of Patent: Jul. 5, 2022

(54) COMPOSITE MATERIAL REWORK PARTS AND METHODS OF MAKING COMPOSITE REWORK PARTS

(71) Applicant: The Boeing Company, Chicago, IL (US)

(72) Inventors: Justin H. Register, Charleston, SC (US); Andrew Staal, Huntington Beach, CA (US); Gregory J. Smith, Renton, WA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 16/450,369

(22) Filed: Jun. 24, 2019

(65) Prior Publication Data
US 2020/0398504 A1 Dec. 24, 2020

(51) Int. Cl.
*B29C 70/34* (2006.01)
*B29C 70/44* (2006.01)
(Continued)

(52) U.S. Cl.
CPC ............ *B29C 70/342* (2013.01); *B29C 70/44* (2013.01); *B64F 5/40* (2017.01); *B29K 2063/00* (2013.01); *B29K 2105/0872* (2013.01); *B29K 2105/10* (2013.01); *B29K 2105/243* (2013.01); *B29L 2031/30* (2013.01)

(58) Field of Classification Search
CPC ... B64F 5/40; B29L 2031/30; B29K 2063/00; B29K 2105/0872; B29K 2105/243; B29K 105/08; B29K 105/10; B29K 105/24; B29K 63/00; Y10T 156/1195; Y10T 156/1002; Y10T 156/1028; Y10T 156/1089; Y10T 156/1092; C09J 2301/502; B29C 65/48; B29C 65/721; B29C 70/44; B29C 70/342; B29C 70/34; B29C 65/4815; B29C 66/721; B29C 66/723; B29C 66/45; B29C 66/73754; B29C 73/10; B29C 65/04; B32B 2405/00; B32B 2605/00; B32B 37/12; B32B 37/1207; B32B 37/18; B32B 3/08; B32B 5/28; B32B 5/24; B32B 5/12; B32B 5/26; B32B 43/06; B32B 2038/0076; B32B 2305/076; B32B 2305/72; B32B 7/12; B32B 2260/023; B32B 2260/046; B32B 2262/10; B32B 2262/103; B32B 2262/105; B32B 2262/106; B32B 2262/14; B32B 2605/18
USPC ......... 428/292.1, 411.1, 297.7, 297.4, 299.1, 428/299.4, 299.7; 156/98, 249, 313, 94, 156/719, 307.1
See application file for complete search history.

(56) References Cited

U.S. PATENT DOCUMENTS

| | | | |
|---|---|---|---|
| 2016/0214328 A1* | 7/2016 | MacAdams | B29C 70/30 |
| 2019/0168481 A1* | 6/2019 | Butler | B32B 37/18 |
| 2019/0276586 A1* | 9/2019 | Peters | C08L 63/10 |

* cited by examiner

*Primary Examiner* — Camie S Thompson
(74) *Attorney, Agent, or Firm* — Coats & Bennett, PLLC

(57) ABSTRACT

Methods, apparatuses and systems are disclosed for making and applying composite material rework parts to rework composite substrates by partially forming a composite material rework part before staging the rework part onto the composite substrate. An approximate geometry is imparted to the partially formed rework part, with the final composite material rework part geometry imparted by the composite substrates requiring rework, as the rework part is finally shaped and cured in situ on the composite substrate.

20 Claims, 8 Drawing Sheets

(51) Int. Cl.
*B64F 5/40* (2017.01)
*B29K 63/00* (2006.01)
*B29L 31/30* (2006.01)
*B29K 105/08* (2006.01)
*B29K 105/10* (2006.01)
*B29K 105/24* (2006.01)

COMPOSITE MATERIAL REWORK PARTS AND METHODS OF MAKING COMPOSITE REWORK PARTS

TECHNOLOGICAL FIELD

The present disclosure relates generally to the field of composite materials and methods for their manufacture and rework. More specifically the present disclosure relates to the field of composite materials used for reworking composite parts, methods for reworking composite parts and components and larger structures comprising reworked composite parts.

BACKGROUND

Reworking of structural components typically includes providing a replacement component. For a metallic structural component having a particular component geometry (geometry equivalently referred to herein as "shape" or "dimension") and requiring rework, metallic replacement parts having the required matching component geometry are often inventoried or can be procured from a supplier in a short delivery time frame of hours or days.

In certain industries, such as the vehicle and aircraft industries, certain structural metallic components are being replaced by lighter composite materials. Such composite materials have strength characteristics that at least approximate or that surpass their metallic component counterparts, while offering weight advantages. When composite material components are reworked, composite rework materials are used. However, composite reworking is more labor intensive than reworking metal components.

When rework on a region of a composite part is required, such rework of a composite part region is accomplished by scarfing techniques that remove (e.g., by sanding, etc.) one or more layers of composite material such that a depression is formed in the substrate material surface. Such scarfed regions are then "built" back up through the deposit of new composite material, followed by appropriate curing of the newly deposited composite material. Such scarfing techniques are time consuming and work intensive. In addition, amounts of composite material that do not require rework, but that border the rework region, are often at least partially impacted for the purpose of achieving a successful scarfing protocol. In addition, scarfing techniques are not always practical on a structural composite part, requiring replacement of composite parts or sections of composite parts. Such composite part replacement adds to the overall cost of rework and is time-consuming.

SUMMARY

Present aspects disclose methods for significantly reducing the time and expense associated with reworking structural composite components, and further disclose new composite rework parts, and composite rework parts made according to disclosed methods.

According to present aspects, a pre-shaped composite laminate rework material is disclosed, with the composite laminate rework material including a plurality of composite laminate precursors, equivalently referred to herein as composite laminate "books". The composite laminate precursors each include at least a first prepreg layer, and at least a second prepreg layer, with first and second prepreg layers configured to be oriented adjacent to each other, and with at least one adhesive layer configured to be oriented between adjacently oriented composite laminate precursors.

A further disclosed aspect is directed to a composite laminate rework material, with the composite laminate rework material including a composite rework material interior geometry.

In another aspect, the composite laminate rework material includes a composite laminate rework material interior geometry that dimensionally complements a substrate surface section exterior geometry of a substrate surface section.

Another aspect is directed to a composite material rework part including a plurality of composite laminate precursors, with the composite laminate precursors configured to form a composite laminate stack with each composite laminate precursor including a first prepreg layer, a second prepreg layer, with the first and second prepreg layers configured to be oriented adjacent to each other, and an adhesive layer, with the adhesive layer configured to be oriented between adjacent composite laminate precursors. A predetermined number of the composite laminate precursors are configured to be removable from the composite laminate stack and combined to form a composite material rework part, and wherein the composite rework part retains a first predetermined geometry imparted to composite laminate stack.

In a further aspect, the composite laminate precursors are partially cured to form the composite material rework part.

In another aspect, a method is disclosed including forming a composite laminate stack with the composite laminate stack including a plurality of composite laminate precursors, with the composite laminate precursors including a first prepreg layer, a second prepreg layer, and with the first and second prepreg layers configured to be oriented adjacent to each other, and an adhesive layer, with the adhesive layer configured to be oriented between adjacent composite laminate precursors. The method further includes orienting a plurality of composite laminates precursors proximate to one another to form the composite laminate stack, imparting a first predetermined geometry into the composite laminate stack, and partially curing the composite laminate stack to form a partially cured composite laminate stack, with the partially cured composite laminate stack including a plurality of partially cured composite laminate precursors. A predetermined number of partially cured composite laminate precursors are removable from the partially cured composite laminate stack to form a composite material rework part. After forming the composite material rework part by removing the partially cured composite laminate precursors from the composite laminate stack, the composite material rework part is configured to retain the first predetermined geometry imparted into the composite laminate stack. In a further aspect, a method for performing rework of a substrate surface is disclosed including applying a composite material rework part to a composite substrate exterior surface of a composite substrate, with the composite substrate exterior surface including a composite substrate exterior surface geometry, and with the composite material rework part including a first predetermined composite material rework part interior surface geometry that is approximately complementary to, and approximately configured to mate with, the composite substrate exterior surface geometry. According to a further aspect of a disclosed method, the composite material rework part further includes a plurality of composite laminate precursors, with the composite laminate precursors including at least a first prepreg layer, at least a second prepreg layer, with the first and second prepreg layers configured to be oriented adjacent to each other; and at least one adhesive layer, with the adhesive layer configured to be oriented between adjacent composite laminate precursors. The method further discloses curing the composite material rework part in situ on the composite substrate exterior surface to form a cured composite material rework part, with the cured composite material rework part comprising a cured composite material rework part interior surface, with the cured composite material rework part interior surface including a final predetermined cured composite material rework part interior surface geometry, and wherein the final predetermined cured composite material rework part interior surface geometry is substantially complementary to the composite substrate exterior surface geometry.

In a further aspect, the complementary nature of the facing geometries of the composite substrate exterior surface and the cured composite material rework part interior surface allows the two structure to mate intimately and precisely, preferably without the need for shimming steps or shims inserted between the "mated" surfaces According to a further aspect, a partially cured composite material rework part includes a partially formed composite material rework part.

In another aspect, in the step of curing the composite material rework part in situ on the composite material substrate exterior surface, the method further includes applying a vacuum to the composite material rework part.

In another aspect, the composite substrate exterior geometry comprises at least one of a non-planar geometry, an irregular geometry, a contoured geometry or combinations thereof.

In further aspects, disclosed methods further include removing the cured composite material rework part from the substrate surface, finishing the cured composite material rework part, reapplying the cured composite material rework part to the substrate surface; and securing the cured composite material rework part to the substrate surface.

In a further aspect, the composite rework material interior surface geometry is dimensionally complementary to the substrate exterior surface geometry, such that the composite rework material is configured to "mate" with the substrate.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
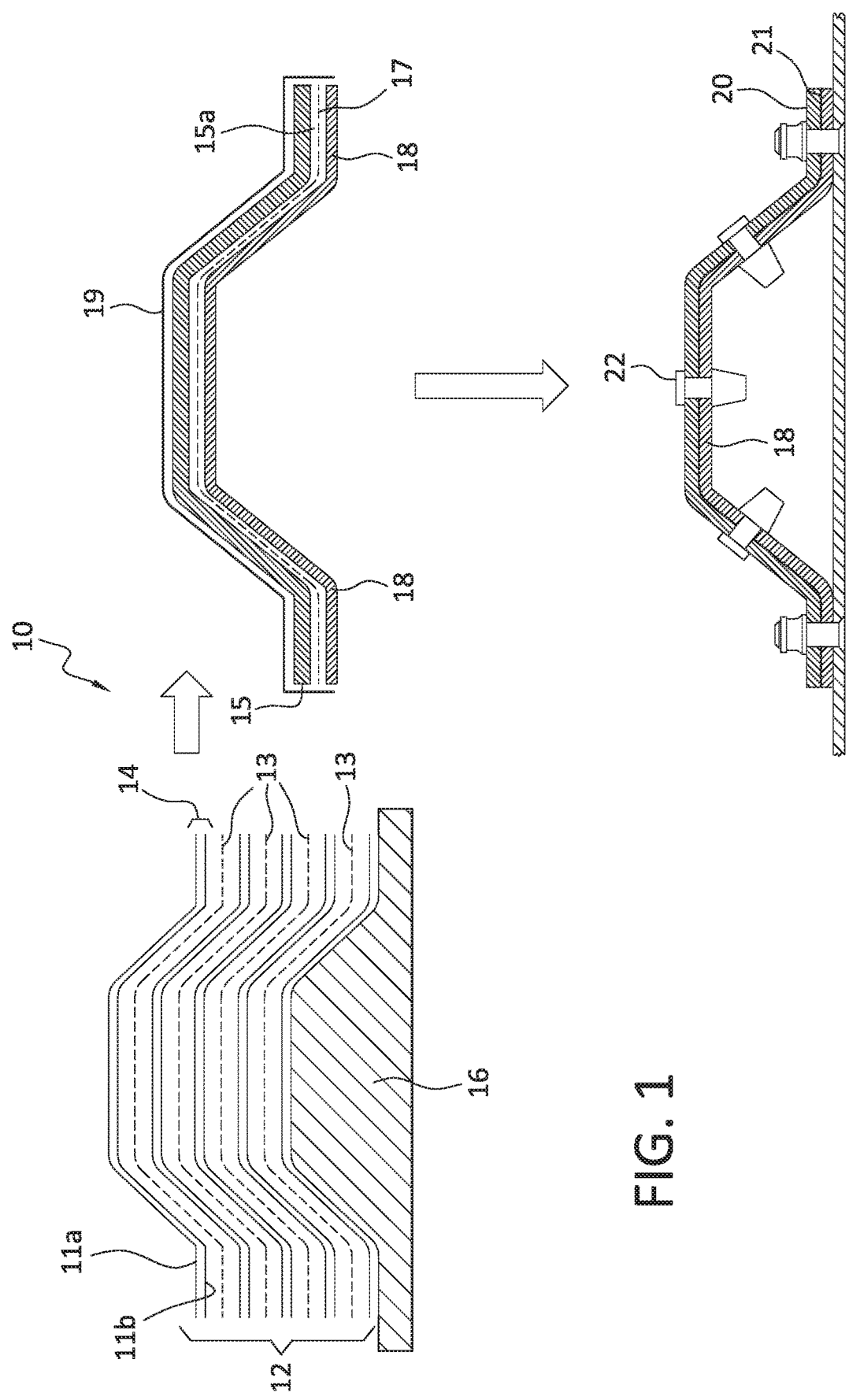
Figure 2:
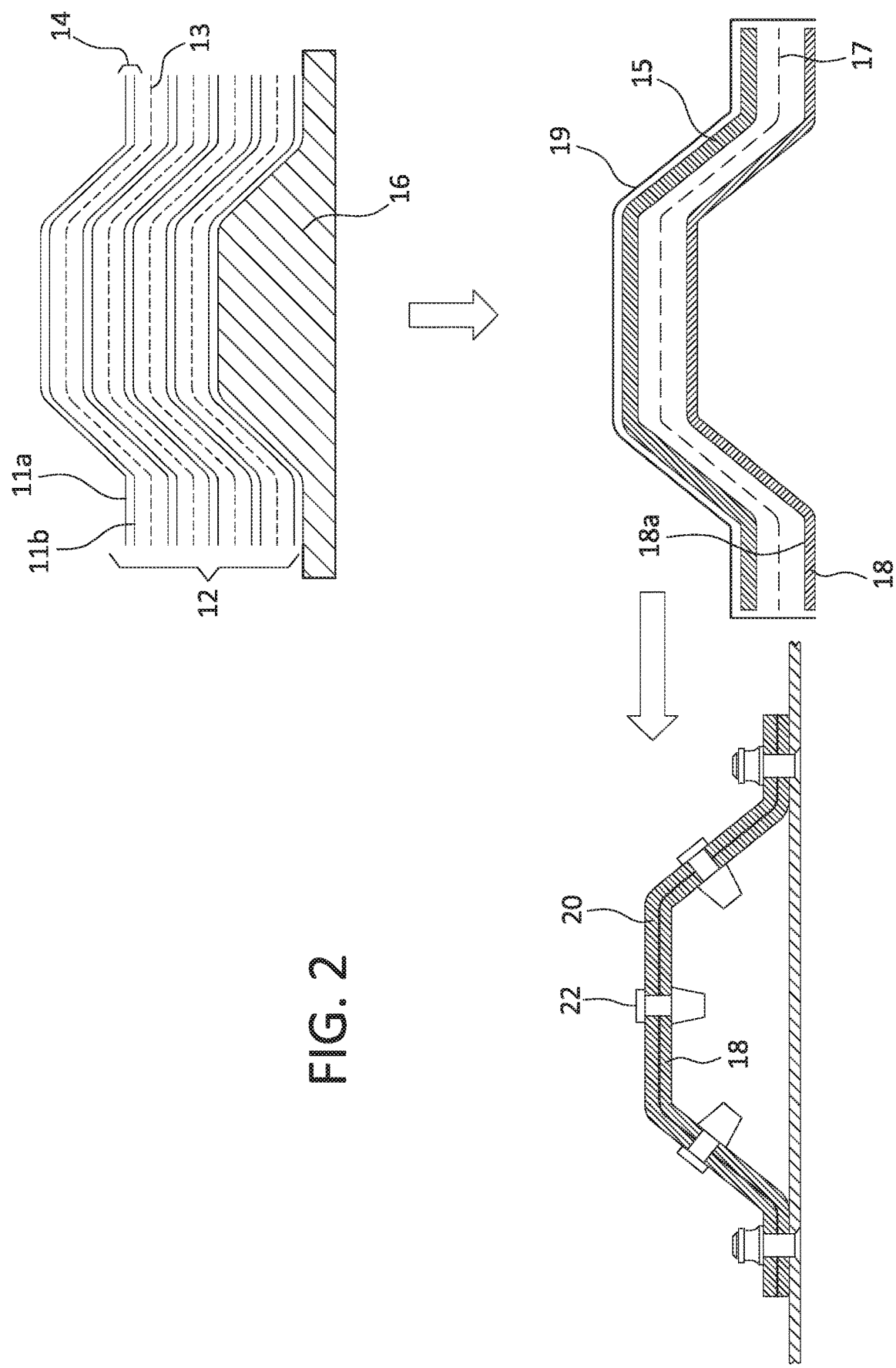
Figure 3:
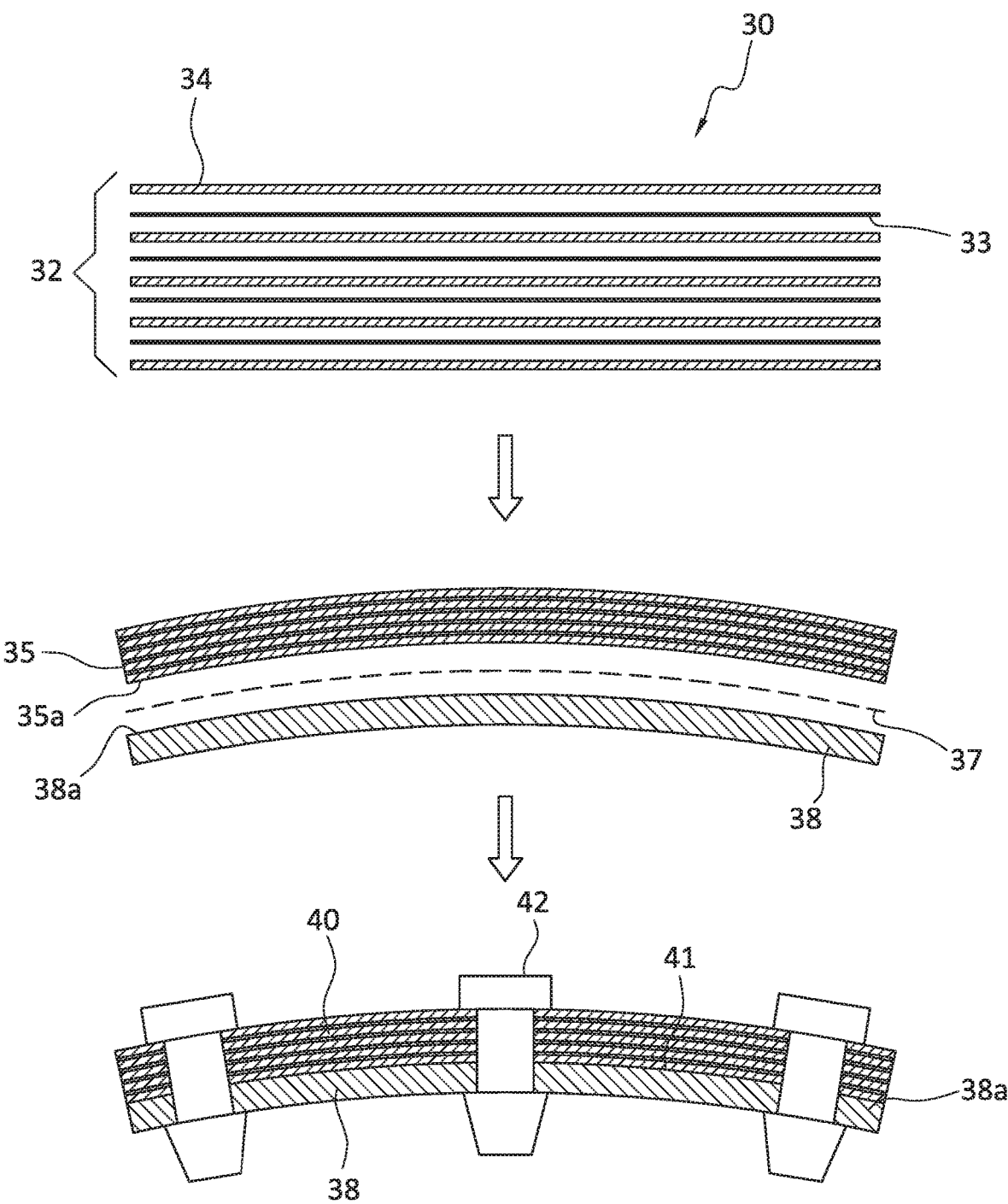
Figure 4:
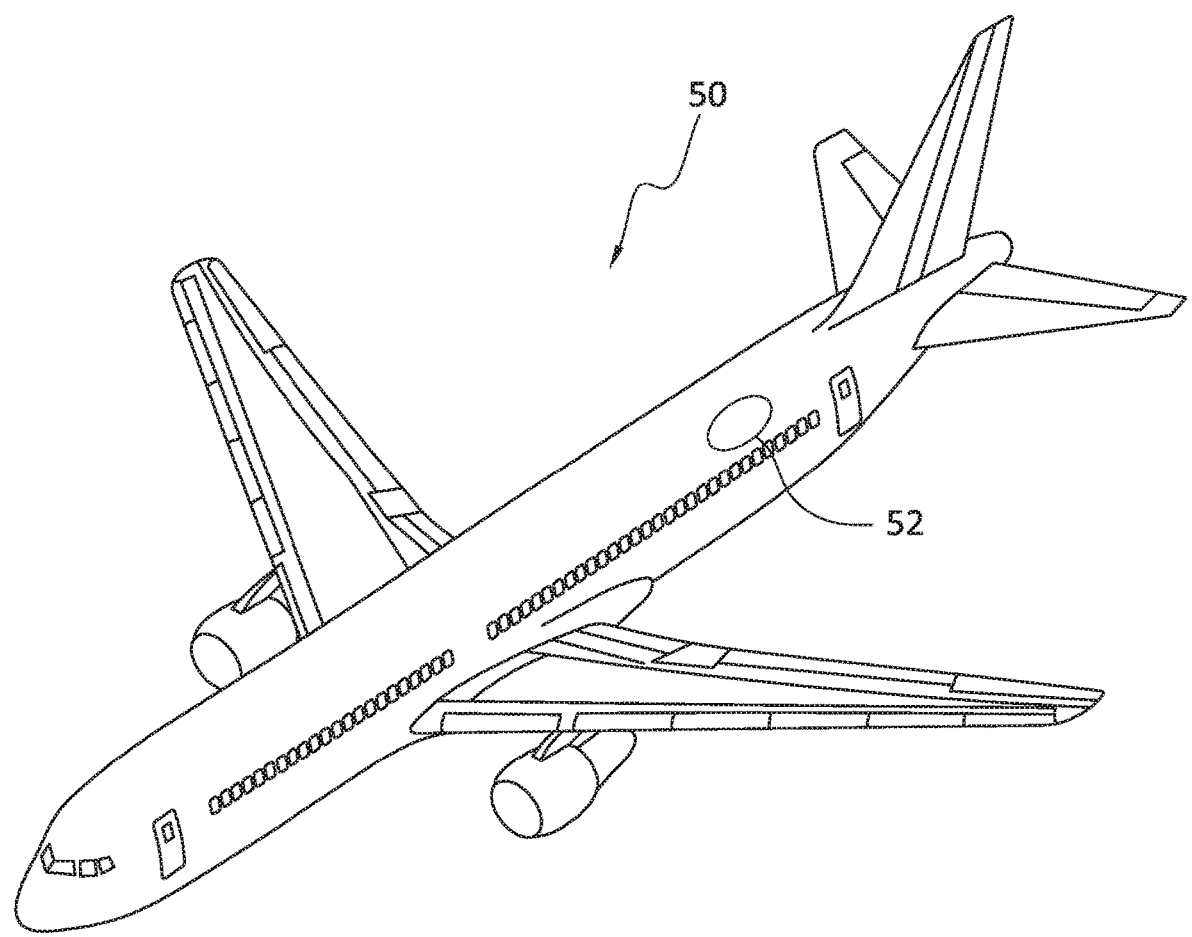
Figure 5:
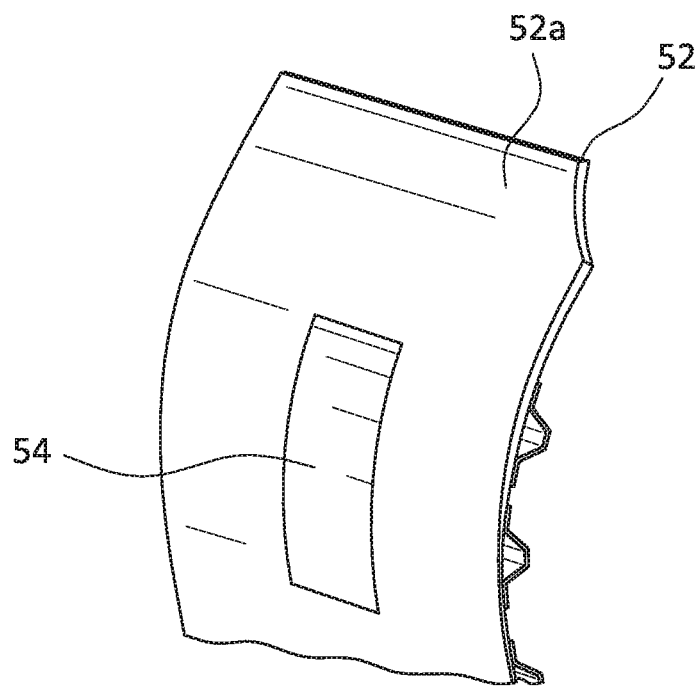
Figure 6:
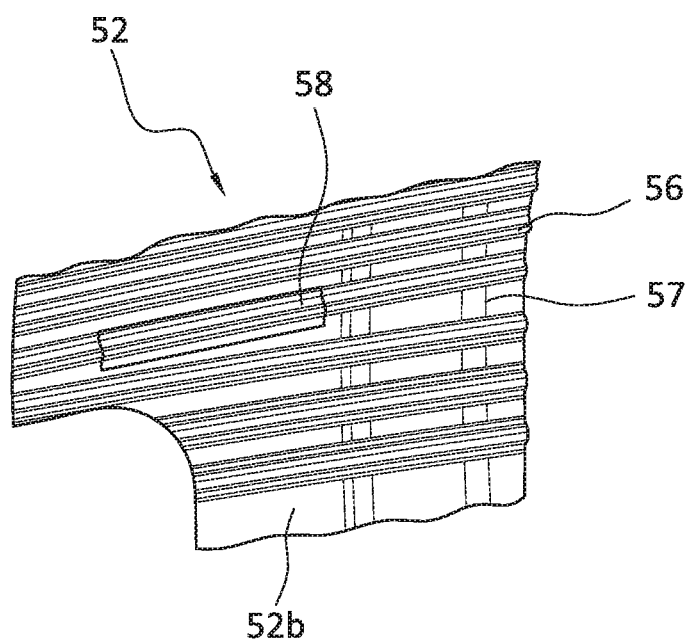
Figure 7:
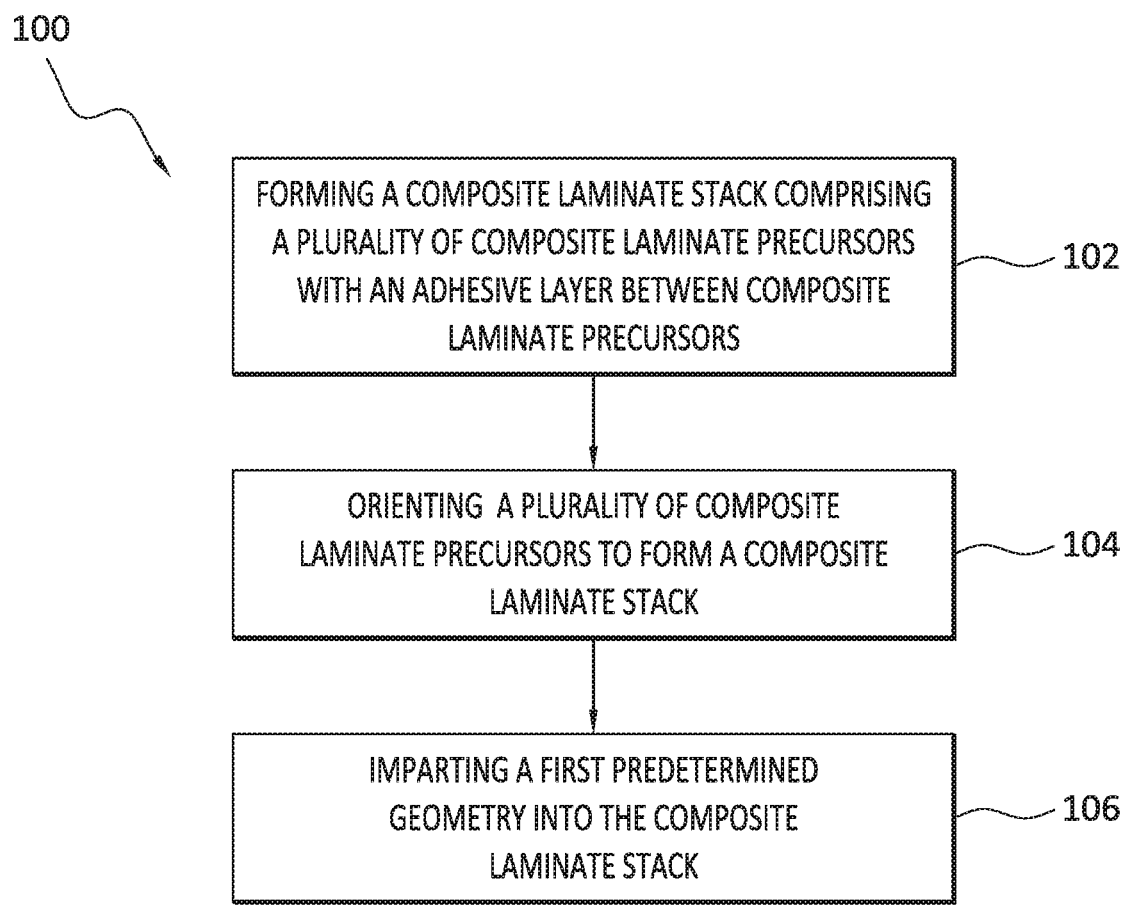
Figure 8:
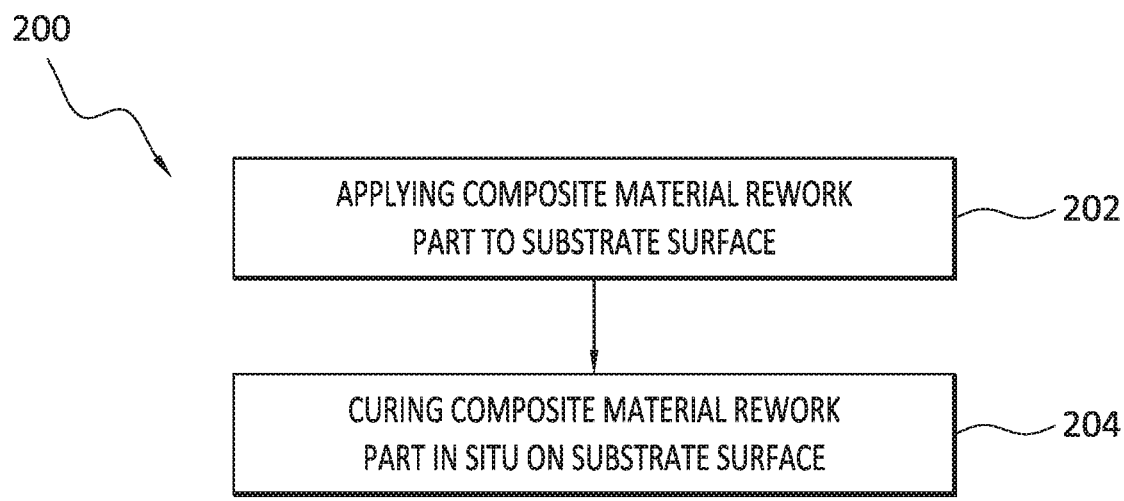

Having thus described variations of the disclosure in general terms, reference will now be made to the accompanying drawings, which are not necessarily drawn to scale, and wherein:

FIG. 1 is an illustration of a process of making the composite laminate stack and the composite rework material part and reworking a substrate surface according to a present aspect;

FIG. 2 is a further illustration of a process of making the composite laminate stack and the composite rework material part and reworking a substrate surface according to a present aspect, showing an enhanced view of a release film layer not necessarily drawn to scale;

FIG. 3 is an illustration of a rework part and rework process for a contoured surface according to a present aspect;

FIG. 4 is an illustration of a vehicle that includes surfaces and components able to be reworked according to a present aspect;

FIG. 5 is an illustration of a component part incorporating rework according to a present aspect;

FIG. 6 is an illustration of a structural component part reworked according to a present aspect;

FIG. 7 is a flowchart outlining a method according to a present aspect;

FIG. 8 is a flowchart outlining a method according to a present aspect; and

Figure 9:
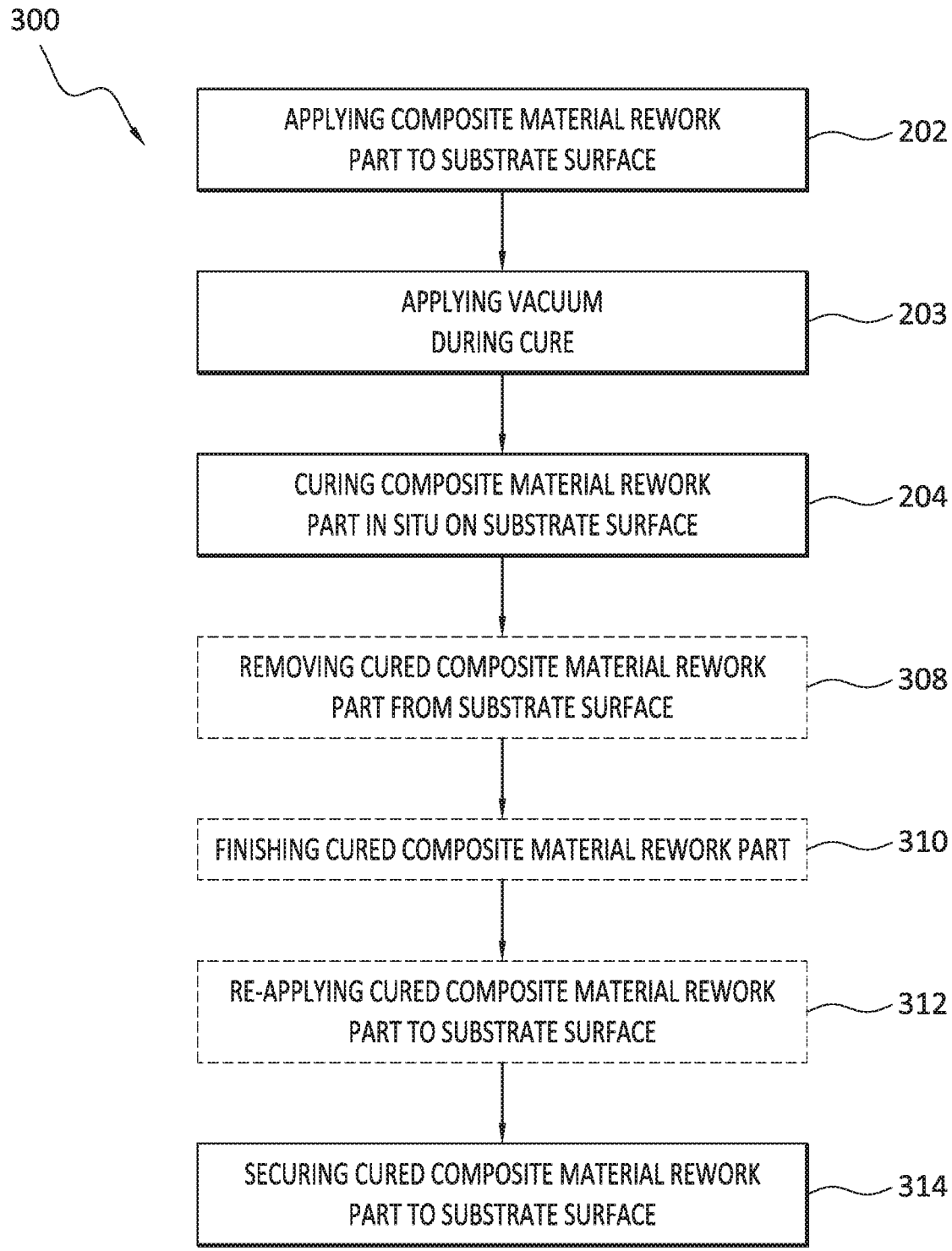

FIG. 9 is a flowchart outlining a method according to a present aspect.

DETAILED DESCRIPTION

Composite materials are often layered into laminates that have a number of composite material layers, often called "prepregs. Prepregs are "pre-impregnated" composite fibers where a matrix material, such as an epoxy resin-containing material, is already present. The fibers often take the form of a weave and the matrix is used to bond them together and to other components during manufacture. The matrix is typically partially cured to allow easy handling; this is called B-Stage material and requires cold storage to prevent complete curing. Therefore, B-Stage prepregs are stored in cooled areas, as heat accelerates complete polymerization. Hence, an autoclave or oven, or other heat source is often required to complete the curing where manufacturing structures comprise prepreg layers or plies. Prepregs also allow one to impregnate a bulk amount of fiber and then store the prepreg in a cooled area for an extended time until a later cure. Prepregs are typically formed on a flat workable surface. Stacks of prepreg plies are then formed and, if desired, can be shaped into a desired shape using shaping or forming tools, also called mandrels.

Maintaining and replacing an extensive inventory of composite forming tools required to produce sharped composite parts is expensive. In addition, for reworking composite structural parts, a close "fit" is desired and the addition of shims and shimming material is often required to obtain required tolerances between the rework part and the substrate material being reworked. In addition, unlike metallic parts and metallic rework parts, since composite parts must be cured, attaining the required fit and tolerances between a substrate and a rework part can be difficult to achieve. Further, an end user engaged in a rework protocol often relies on an after-market rework part having a specified dimension. Such standardization of metallic rework part dimensions is more easily obtained. However, end-users of composite structures have not been afforded a reliable protocol to rework structural composite parts, without resulting to arduous, time-consuming and expensive composite material rework techniques that often take a structure or large object (e.g., an aircraft, etc.) out of service for extended periods (e.g. days or weeks, etc.) while the rework is conducted.

Present aspects are directed to improving the rework processes for composite material substrates by pre-forming or pre-shaping to a general dimension, pre-curing, or otherwise partially forming a composite rework material for use in reworking a composite substrate, and then orienting a pre-shaped composite material rework part directly onto the substrate requiring rework. The interior surface geometries of the rework part (that can act as a rework "patch", etc.) and the exterior surface of the composite substrate requiring rework are configured to be complementary to one another; at least to the extent that the composite material rework part can approximately or at least imperfectly and generally "mate" with the composite substrate requiring rework. An imperfect mating of the composite material rework part with the composite substrate requiring work is said to represent a "substantially complementary" mating. A final curing process is then conducted, preferably under vacuum (e.g. a composite curing vacuum bag assembly, etc.) and in the presence of heat, that serves to activate and cure the adhesive layer(s) in the composite material rework part, more fully cure the prepreg plies in the rework part, and compress the composite material rework part against the composite substrate requiring rework. According to present aspects, through this process, the composite material rework part is finally "shaped" to intimately contact the composite substrate exterior surface and assure an enhanced "fit", with the composite substrate exterior surface serving as the final form or "mold", at least for the purpose of insuring the closest possible tolerances of "fit" between the rework part and the substrate requiring rework, as the rework part has its final shaping and curing provided in situ, and in place on the region of the composite substrate requiring rework.

When aviation rework requirements mandate the physical fastening of a composite material rework part in place on a composite substrate requiring rework, present aspects further include bolting, or otherwise fastening (with appropriate fasteners, etc.) the cured composite material rework part onto the composite substrate requiring rework, as will be explained below. After the vacuum curing, but prior to the physical fastening of the composite material rework part, the part can be removed from the composite substrate, and final finishing can be conducted on the finally shaped composite material rework part such as, for example, edge trimming, etc. According to further aspects, presently disclosed methods, apparatuses, and systems contemplate the ability to rework a substrate according to future mandated composite rework procedures that may not require a final fastening of the rework parts into place on the composite substrates being reworked, but that can achieve adequate composite bonding without supplement physical fasteners and fastening procedures.

The pre-formed composite material rework part can be partially cured to retain an initial form, having an imparted approximate or "rough" complementary geometry that will approximately "mate" with a composite substrate exterior surface requiring rework. Individual prepreg plies are layed up onto an adhesive layer, preferably on a forming tool having a predetermined surface geometry (with the geometry then imparted to the layed up prepreg plies). In the case of epoxy-based resin composite prepregs, as the prepregs warm to room temperature, a partial or incomplete cure of the prepregs will create a multiple-ply material that can be manipulated individually as individual composite laminate precursors or "books". The desired number of plies with an associated interposed adhesive layer that form each "book" can be maintained in a "stack", until the "books" are needed for a rework procedure.

FIG. 1 illustrates aspects of the present disclosure. FIG. 1 shows a system for manufacturing a composite rework part. A first step in FIG. 1 illustrates assembling a composite laminate stack 12 that includes a plurality of partially formed composite laminate precursors 14, and an adhesive layer 13 interposed between stacked partially formed composite laminate precursors 14, also referred to as "books". The partially formed composite laminate precursors 14 are shown in FIG. 1 as comprising two prepreg plies. However, according to further aspects not shown, the partially formed composite laminate precursors 14 can comprise, for example, three, four, five, or more plies, as desired. The composite laminate precursors can be partially cured. As shown in FIG. 1, the partially formed composite laminate precursors can be partially cured, or "pre-cured" prior to disposing the composite laminate stacks onto, for example, a composite material forming tool 16 (e.g., a forming mandrel, etc.) that imparts a general shape to the composite laminate stack and to the individual partially formed composite laminate precursors. According to present aspects, as shown in FIG. 1, the adhesive layer 13 that is interposed between the composite laminate precursors does not bond the composite laminate precursors within the composite laminate stack. Instead, desired number of "books" that includes a plurality of "books" (with the adhesive layer interposed between the "books") can be removed from the composite laminate stack 12 and oriented onto a substrate requiring rework. In the partially cured, or pre-cured state, the plurality of partially formed composite laminate precursors 14, once removed from the composite laminate stack 12, are referred to as, and are shown in FIG. 1 as becoming, the composite material rework part 15.

According to a present aspect, as shown in FIG. 1, a predetermined dimension is imparted to the plurality of composite laminate precursors 14 and to the composite laminate stack 12 by forming the composite laminate stack 12 on a composite material forming tool 16 to "roughly" form the plurality of composite laminate precursors, that then become the composite material rework part 15, also referred to equivalently herein as the "partially formed composite material rework part" 15. The forming tool 16 as shown imparts an initial predetermined geometry to the composite laminate precursors 14, the composite laminate stack 12 and, by extension to the composite material rework parts 15 as desired, with the desired and predetermined imparted geometry including, for example, a planar geometry, a non-planar geometry, an irregular geometry, a contoured geometry, etc.

A composite material rework part 15 that includes a predetermined number of partially formed composite laminate precursors 14 can be removed from the composite laminate stack 12 and positioned or oriented onto a composite substrate exterior surface 18a of a composite substrate 18 requiring rework. The partially formed composite rework part 15 is then fully cured in place, in situ, on the substrate exterior surface using a vacuum bagging apparatus 19 to form a cured composite material rework part 20. As shown in FIG. 1, the cured composite material rework part 20 is shown as fastened into place proximate to the composite substrate 18 via fasteners 22 that can be, for example, a bolt or other fastening assembly. Necessary drilling of the cured composite material rework part 20 and the composite substrate 18 can be conducted, preferably post-cure, to provide the necessary apertures for the fasteners in the cured composite rework part 20 and the composite substrate 18. An optional release layer 17 can be applied either to the composite substrate exterior surface or applied to the composite material rework part interior surface. The release layer 17, if present facilitates the post-cure removal of the composite material rework part from the composite substrate, if finishing steps are required for the rework part prior to fastening the rework part onto the substrate material requiring rework.

Because the cured composite material rework part has been cured in place and in situ against the composite substrate part, the cured composite material rework part interior surface dimensionally complements the composite substrate exterior surface such that the cured composite material rework part interior surface dimensionally "mates" with the composite substrate exterior surface, thus assuring a close fit that preferably obviates the need for shimming, that would otherwise be required to assure a proper fit, by taking up any inconsistencies as to "spaces" along the mating surface between the cured composite material rework part interior surface and the composite substrate exterior surface. According to present aspects, the composite substrate requiring rework becomes a final shaping tool with respect to shaping a partially formed composite material rework part (that may possess a desired degree of flexibility) in situ, and then curing the partially formed composite material rework part into a cured and final composite material rework part in situ, against the composite substrate requiring rework.

According to present aspects, the composite material rework part 15 is cured in situ directly on the composite structure according to whatever rework curing protocol is required for composite substrate requiring rework and the composite material rework part, including applying required heat and pressure, and further including an applied vacuum. According to non-limiting present aspects, a composite material cure regimen comprising applying heat at a temperature ranging from about 250° F. to about 350° F. for specified times in the presence of a vacuum having an applied pressure, such as, for example, a vacuum bagging assembly.

The prepregs of the present disclosure are understood to be composite prepregs comprising a fiber component and a resin-containing component. Contemplated fibers for use in the composite prepreg include, without limitation, carbon fibers, carbon/graphite fibers, glass fibers, aramid fibers, boron fibers, etc., and combinations thereof.

Contemplated resin-containing components of the composite rework parts and the composite substrate can include, for example, epoxy resin-based compounds. Representative epoxy resin-based compounds include, without limitation, diglycidyl ethers of bisphenol A; diglycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, or combinations thereof. In a further aspect, the particulate material can comprise a curative compound including, without limitation, 4,4"-diamino diphenyl sulfone; 3,3"-diamino diphenyl sulfone, diethyl toluene dianiline; or combinations thereof. Contemplated resin-containing components can further include, for example, acrylic based compounds compatible with a composite substrate requiring rework.

According to aspects of the present disclosure, the epoxy resin-containing prepreg material may be manufactured into a partially cured state and stored in the partially cured, or "staged" state, in rolls or sheets until ready to be laid up, for example, onto forming tools including, without limitation, shaping and forming mandrels. The staged epoxy resin-containing prepreg material preferably has a viscosity ranging from about 60,000 poise to about 1000 poise.

In the field of composite manufacturing, there are many advantages to using a thermosetting B-stage system. The need for measuring and mixing is eliminated since this is a one-part system. In many cases, thermosetting B-stage systems help to increase the performance of the product and decrease the overall manufacturing/production cost. Also, thermosetting B-stage systems can be more convenient to use in many applications as compared with a two-part systems. Thermosetting B-stage systems are understood herein to comprise epoxy-resin thermosetting B-stage systems. While the present application refers to epoxy-resin systems, it is understood that aspects of the present application can be extended to B-stage and other systems composite material systems beyond those specifically incorporating epoxy resins.

FIG. 2 shows aspects of the present disclosure and that are shown in FIG. 1, in greater detail. FIG. 2 shows system 10 in greater detail with composite laminate stack 12 including a plurality of partially formed composite laminate precursors 14, alternately referred to as composite "books", and an adhesive layer 13 interposed between stacked partially formed composite laminate precursors 14. The adhesive layer can be a low temperature film adhesive such as, for example, an adhesive having characteristics similar to Loctite® EA9696, etc. As further shown in FIG. 2, a predetermined general dimension is imparted to the plurality of partially formed composite laminate precursors 14 and to the composite laminate stack 12 by forming the composite laminate stack 12 on a composite material forming tool 16 to form a plurality of partially formed composite laminate precursors 14 that, once removed from the composite laminate stack 12 become composite material rework parts 15. For illustration purposes only, a composite material rework part 15 is shown in FIG. 2 as including two individual composite material plies 30, although, according to present aspect, the composite material rework parts 15 (equivalently and interchangeably referred to herein as "books"), can include any desired number of composite laminate precursors, and the composite laminate precursors can comprise any desire number of individual composite prepreg plies.

As contemplated by present aspects, once the partially formed composite material rework parts 15 have been formed into a "rough" or approximate dimension or geometry by impacting the composite material forming tool 16, when rework on a composite substrate is desired, a predetermined number of partially formed composite laminate precursors 14 can be removed from the composite laminate stack 12 and can be used to form composite material rework part 15 that will become the final composite material rework part that will be cured in situ and in place on the composite substrate requiring rework. An optional release layer 17 can be applied either to the composite substrate exterior surface or applied to the composite material rework part interior surface. The release layer 17, if present facilitates the post-cure removal of the composite material rework part from the composite substrate, if finishing steps are required for the rework part prior to fastening the rework part onto the substrate material requiring rework.

FIG. 2 further shows five composite material rework parts 15, or "books", that have been removed from composite laminate stack 12 and that are then brought into contact with and oriented onto a composite substrate 18 requiring repair. The composite substrate 18 with the five composite material rework parts 15 in place are then prepared for a final curing, with the final curing including steps of providing heat, such as by an autoclave, heat blanket, etc., and by providing a vacuum via, for example by providing a vacuum bagging apparatus 19 and employing a vacuum bagging technique that is used to cure composite materials. In this way, the composite material rework part 15 in a partially formed state becomes cured to a final state in situ while directly in place on the composite substrate exterior surface of the composite substrate requiring rework, and the composite material rework part 15 becomes the cured composite material rework part 20. Unused composite laminate precursors, or "books" can remain stored on the stack 12 until they are needed for subsequent rework processes.

The composite material rework parts, and methods for completing the manufacture of such composite rework parts in situ on a composite structure requiring rework, according to present aspects, can rework composite structures that have any planar, non-planar, regular, irregular, contoured, complex, or other substrate exterior surface geometry. In addition, if the composite laminate stack and/or the individual "books", and/or the composite material rework parts (that incorporate a plurality of "books") have a certain predetermined flexibility, and the composite substrate requiring rework has a certain composite substrate exterior surface geometry (e.g., planar geometry, or only a slightly contoured geometry, etc.), the intermediate "tooling" of the prepreg plies can be obviated, if desired, while still accomplishing a final curing of the composite material rework part in situ on the composite substrate requiring rework.

For example, FIG. 3 shows a composite laminate stack 32 including a plurality of composite laminate precursors 34, alternately referred to as composite "books", with at least one adhesive layer 33 interposed between stacked composite laminate precursors 34. As further shown in FIG. 3, a composite substrate 38 requiring repair has a composite substrate exterior surface 38a having a geometry shown as being curved or having a concave outer contour. In this illustrated configuration, as shown in FIG. 3, a predetermined number of composite laminate precursors with at least one interposed adhesive layer are layed up to form a composite laminate stack 32 a flat orientation that can become the composite material rework part 35 having a composite material rework part interior surface. In other words, in contrast to the processes and composite rework material configurations shown in FIGS. 1 and 2, as shown in FIG. 3, no intermediate tooling is used to form a "rough" shapes into the composite laminate stack 32. A predetermined number of "books", or the entirety of the composite laminate stack 12 (e.g., all of the "books" in the composite laminate stack) can be transferred to the composite substrate exterior surface 38a of the composite substrate 38 requiring rework. The curing processes are then provided to the substrate that now comprises the rework surface, as described in connection with FIGS. 1 and/or 2 to produce a cured composite material rework part 40. Preferably after curing, the cured composite material rework part is fastened into place on the composite substrate 38 requiring rework via fasteners 42 such as, for example bolt assemblies, or other type fasteners, etc., as explained above.

FIG. 4 is a representative illustration of a vehicle comprising composite components that may require rework, and that can be advantageously reworked according to present aspects. As shown in FIG. 4 an aircraft 50 comprises a fuselage section 52.

FIG. 5 shows an enlarged view of the fuselage exterior section 52a of fuselage section 52 of aircraft 50 shown in FIG. 4, wherein a cured composite material rework part 54 has been cured in situ on the contoured surface of the fuselage exterior section 52a. As shown in FIG. 5, the composite material rework part 54 has an interior surface that is dimensioned to complement the contour of the fuselage section exterior. According to a further aspect, the cured composite material rework part 54 can be made according to processes described above and shown in FIG. 3, where the composite material rework part is essentially planar, but is flexible enough to conform to a contour of a composite substrate exterior surface requiring rework.

FIG. 6 is an illustration of an interior view of a fuselage section 52 showing a fuselage section interior 52b including primary structural composite components including a stringer 56 and a frame 57, with such primary structural composite components being representative of further structural composite components (not shown) that could be reworked according to aspects of presently disclosed methods using presently disclosed composite rework materials applied directly to the composite substrate exterior surfaces to impart a close mating geometry to the composite rework part interior surface, followed by in situ curing, and fastening, as explained above. As shown in FIG. 6, a composite material rework part 58 has been cured in situ for the purpose of reworking a stringer 56 requiring rework.

FIG. 7 is a flowchart outlining aspects of a presently disclosed method 100 for making a composite material rework part including forming 102 a composite laminate stack with the composite laminate stack including a plurality of composite laminate precursors, with the composite laminate precursors each including at least a first prepreg layer at least a second prepreg layer, with the first and second prepreg layers configured to be oriented adjacent to each other, and at least one adhesive layer, and with the adhesive layer configured to be oriented between adjacent composite laminate precursors. The method 100, further includes orienting 104 a plurality of composite laminates precursors proximate to one another to form the composite laminate stack; and removing a plurality of composite laminate precursors from the composite laminate stack and forming 108 a partially formed composite material rework part. The partially formed composite material rework part can be formed, for example, by partially curing the composite laminate precursors and thereby at least partially curing the composite laminate stack and the partially formed composite material rework part. According to present aspects, the term "partially" formed composite material rework part connotes that the composite material rework part is flexible and can, for example, be partially cured, if desired, for the purpose of handling the rework part. However, as described herein, the composite material rework part is not said to be finally formed until the composite material rework part is finally cured in situ and in place on the surface of the composite substrate.

FIG. 8 is a flowchart illustrating aspects of a presently disclosed method 200 for reworking a composite substrate including applying 202 the composite material rework part to a composite substrate surface requiring rework; and curing 204 the composite material rework part in situ on the composite substrate surface.

FIG. 9 is a flowchart outlining a further aspect directed to a method 300 for reworking a composite substrate including applying 202 the composite material rework part to a composite substrate surface requiring rework, applying 203 vacuum during curing, and curing 204 the composite material rework part in situ on the composite substrate surface. Method 300 further includes curing 306 the composite material rework part under vacuum and in situ on the composite substrate exterior. Method 300 further shows securing the 314 the cured composite material rework part to the composite substrate by, for example fastening the cured composite material rework part to the composite substrate using fasteners such as, for example bolt assemblies, or other fasteners. If finishing the cured composite material rework part is required or desired prior to securing the part to the substrate, method 300 further optionally shows removing 308 the cured composite material rework part from the composite substrate requiring rework, finishing 310 the cured composite material rework part such as, for example, edge trimming the cured composite material rework part, reapplying 312 the cured composite material rework part (that has now be "finished") to the composite substrate before securing the 314 the cured composite material rework part to the composite substrate by, for example fastening the cured composite material rework part to the composite substrate using fasteners such as, for example bolt assemblies, or other fasteners.

As referred to above, if a trimming process will be required for a cured composite rework material such that the cured rework must be removed from the substrate surface, present aspects further contemplate providing a release film between the composite substrate exterior surface and the adhesive layer of the rework material that would contact the composite substrate exterior surface. Such a release layer 17 is shown in a dotted line in FIG. 1. Useful release films include contact approved polytetrafluoroethylene (PTFE)-containing films or fluorinated ethylene propylene (FEP)-containing films known to be useful as "release films", and that can withstand curing temperatures.

Release film, additional adhesive film having a desired tack, or other film contacting the substrate exterior surface are further presently contemplated, according to additional aspects. Such "tack" layers can have a degree of tack for the purpose of assisting in maintaining the final orientation of the composite rework part on the composite substrate exterior surface prior to and during final curing until a force such as, for example, a vacuum is applied during curing, etc. Such tack layers on presently disclosed composite material rework parts that can reside on the exterior of an adhesive layer, or be incorporated into the adhesive layer can assist in the placement and temporary orientation of, for example, a rework part being applied to, for example, an underside, or side of a contoured surface, an ceiling structural component in an interior space, or any orientation where, for example, gravity can frustrate maintaining the rework part in position against a substrate surface.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects, such stationary objects including, without limitation, bridge trusses, support columns and structures, buildings, general construction objects, etc. Further structures and objects include vehicles, such as, without limitation, aircraft, satellites, rockets, missiles, etc., and therefore further include manned and unmanned aircraft, manned and unmanned spacecraft, manned and unmanned rotorcraft, manned and unmanned terrestrial vehicles, manned and unmanned non-terrestrial vehicles, manned and unmanned surface and sub-surface water-borne vehicles, objects, and structures. Particularly contemplated components include aircraft stringer, spars, ribs, as well as other planar and non-planar geometries used in the manufacture of aircraft components and parts, etc.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof. When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A composite laminate rework material comprising:
   a plurality of partially cured composite laminate rework material precursors, said plurality of partially cured composite laminate rework material precursors configured to be removed from a a partially cured composite laminate rework material precursor stack, said partially cured composite laminate rework material precursor stack comprising, said at least partially cured composite laminate rework material precursor comprising a composite laminate rework material interior geometry, each of said plurality of at least partially cured composite laminate precursors comprising:
   a first prepreg layer;
   a second prepreg layer, said first and second prepreg layers configured to be oriented adjacent to each other;
   an adhesive layer, said adhesive layer configured to be oriented between adjacent composite laminate precursors;
   wherein said composite laminate rework material interior geometry approximately matches a surface section exterior geometry of a composite material part requiring rework;
   wherein a predetermined number of partially cured composite laminate precursors are removable from the composite laminate stack to form a partially cured composite material rework part;
   wherein each of the plurality of partially cured composite laminate rework material precursors retains the composite laminate rework material interior geometry imparted to the composite laminate rework material precursor stack inventory; and
   wherein, when a selected number of the partially cured composite laminate rework material precursors is removed from the at least partially cured composite laminate rework material precursor stack, said selected number of the partially cured composite laminate precursor configured to be finally cured in situ on the composite material part requiring rework.

2. The partially cured composite laminate rework material of claim 1, wherein at least one of the first prepreg layer and the second prepreg layer comprise a fiber-reinforced plastic.

3. The partially cured composite laminate rework material claim 2, wherein the fiber-reinforced plastic comprises at least one of: carbon fibers, carbon/graphite fibers, glass fibers, boron fibers, aramid fibers, and combinations thereof.

4. The partially cured composite laminate rework material of claim 1, wherein the adhesive layer comprises at least one of: thermoset adhesive a thermoplastic adhesive, or combinations thereof.

5. The partially cured composite laminate rework material of claim 1, wherein at least one of the adhesive layer, the first prepreg layer and the second prepreg layer comprise an epoxy-based material.

6. The partially cured composite laminate rework material of claim 1, wherein the plurality of partially cured composite laminate rework material precursors are flexible.

7. An object requiring rework comprising the partially cured composite laminate rework material of claim 1.

8. The object requiring rework of claim 7, wherein the object requiring rework comprises a vehicle, said vehicle comprising at least one of: an aircraft, a spacecraft, a rotorcraft, a satellite, a terrestrial vehicle, a surface waterborne vehicle, a sub-surface waterborne vehicle, a hovercraft, and combinations thereof.

9. An object requiring rework comprising the partially cured composite laminate rework material of claim 1, wherein said partially cured composite laminate rework material is configured to be fully cured to form a fully cured composite laminate rework material, said fully cured composite laminate rework material fully cured in situ while said partially cured composite laminate rework material is in contact with the composite substrate exterior surface.

10. A method comprising:
applying a partially formed composite material rework part to a composite substrate exterior surface of a composite substrate, said composite substrate exterior surface comprising a composite substrate exterior surface geometry, said partially formed composite material rework part comprising a composite material rework part interior surface geometry that is configured to mate with the composite substrate exterior surface geometry, said partially formed composite rework part further comprising:
a plurality of partially cured composite laminate rework material precursors, said plurality of partially cured composite laminate rework material precursors each comprising:
at least a first prepreg layer;
at least a second prepreg layer, said first and second prepreg layers configured to be oriented adjacent to each other;
at least one adhesive layer, said adhesive layer configured to be oriented between adjacent composite laminate rework material precursors;
curing the partially cured composite rework part in situ on the composite substrate exterior surface to form a cured composite material rework part, said cured composite material rework part comprising a cured composite material rework part interior surface, said cured composite material rework part interior surface comprising a final predetermined cured composite material rework part interior surface geometry; and
wherein said final predetermined cured composite material rework part interior surface geometry is substantially complementary to the composite substrate exterior surface geometry.

11. A method comprising:
forming a partially cured composite laminate stack, said partially cured composite laminate stack comprising:
a plurality of partially cured composite laminate rework material precursors, each of said composite laminate rework material precursors comprising:
at least a first prepreg layer;
at least a second prepreg layer, said first and second prepreg layers configured to be oriented adjacent to each other;
at least one adhesive layer, said adhesive layer configured to be oriented between adjacent composite laminate precursors;
orienting a plurality of composite laminate precursors proximate to one another to form the composite laminate stack;
imparting a first predetermined geometry into the composite laminate stack;
partially curing the composite laminate precursors to form a stacked plurality of partially cured composite laminate precursors;
wherein a predetermined number of partially cured composite laminate precursors are removable from the composite laminate stack to form a composite material rework part; and
wherein, after removing the composite material rework part from the composite laminate stack, the composite material rework part is configured to retain the first predetermined geometry imparted into the composite laminate stack.

12. The method of claim 11, wherein the composite laminate rework material precursors comprise an epoxy resin-based composite material.

13. The method of claim 12, wherein the epoxy resin-based composite material comprises at least one of:
diglycidyl ethers of bisphenol A; diglycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl) isocyanurate (and isocyanurates); glycerol diglycidyl ether; trimethylolpropane triglycidyl ether; or combinations thereof.

14. The method of claim 12, wherein the plurality of composite laminate rework material precursors further comprises a curing agent, said curing agent comprising at least one of:
4,4"-diamino diphenyl sulfone; 3,3"-diamino diphenyl sulfone; diethyl toluene dianiline; or combinations thereof.

15. A cured composite material rework part made according to the method of claim 10.

16. The method of claim 15, wherein the step of curing the partially cured composite material rework part in situ on the composite substrate exterior surface further comprises:
applying a vacuum to the partially cured composite material rework part.

17. The method of claim 15, wherein the composite substrate exterior geometry comprises at least one of:
a non-planar geometry, an irregular geometry, a contoured geometry; or combinations thereof.

18. The method of claim 15, wherein at least one of the first prepreg layer and second prepreg layer comprises a fiber-reinforced epoxy resin-based material.

19. The method of claim 15, further comprising:
removing the cured composite material rework part from the composite substrate exterior surface;
finishing the cured composite material rework part;
reapplying the cured composite material rework part to the composite substrate exterior surface; and
securing the cured composite material rework part to the composite substrate exterior surface.

20. A composite substrate exterior surface reworked according to the method of claim 15.

\* \* \* \* \*